(12) United States Patent  
Piwonka et al.

(10) Patent No.: US 8,751,783 B2
(45) Date of Patent: Jun. 10, 2014

(54) BOOTING COMPUTING DEVICES WITH EFI AWARE OPERATING SYSTEMS

(75) Inventors: Mark Piwonka, Tomball, TX (US); Scotty Wiginton, Tomball, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 370 days.

(21) Appl. No.: 13/010,537

(22) Filed: Jan. 20, 2011

(65) Prior Publication Data

US 2012/0191960 A1 Jul. 26, 2012

(51) Int. Cl.
*G06F 9/24* (2006.01)
*G06F 9/00* (2006.01)
*G06F 15/177* (2006.01)

(52) U.S. Cl.
USPC .................................. 713/2; 713/1; 713/100

(58) Field of Classification Search
None
See application file for complete search history.

(56) References Cited

U.S. PATENT DOCUMENTS

| | | | |
|---|---|---|---|
| 6,490,677 B1 | 12/2002 | Aguilar et al. | |
| 6,973,447 B1 * | 12/2005 | Aguilar et al. | 1/1 |
| 7,065,627 B2 * | 6/2006 | Dayan et al. | 711/173 |
| 7,124,290 B2 * | 10/2006 | Larvoire et al. | 713/1 |
| 7,191,328 B2 | 3/2007 | Hobson | |
| 7,590,877 B2 * | 9/2009 | Kim et al. | 713/323 |
| 8,285,978 B2 * | 10/2012 | Kim et al. | 713/2 |
| 2002/0049898 A1 | 4/2002 | Wang | |
| 2003/0110370 A1 * | 6/2003 | Fish et al. | 713/2 |
| 2003/0172228 A1 * | 9/2003 | Chu et al. | 711/112 |
| 2003/0177329 A1 * | 9/2003 | Larvoire et al. | 711/173 |
| 2004/0210848 A1 * | 10/2004 | Vineyard et al. | 715/810 |
| 2006/0294352 A1 | 12/2006 | Morrison et al. | |
| 2007/0162901 A1 * | 7/2007 | Oh | 717/148 |
| 2009/0271600 A1 * | 10/2009 | Joshi et al. | 713/2 |
| 2009/0287918 A1 | 11/2009 | Goldstein et al. | |
| 2009/0327813 A1 * | 12/2009 | Coronado et al. | 714/36 |

OTHER PUBLICATIONS

Unified Extensible Firmware Interface Specificaton Version 2.3, Errata D. Nov. 10, 2010;pp. 61-73 Boot Manager.
The EFI Boot Process http://computertechnos.blogspot.com/2010/08/efi-boot-process.html, Aug. 2010, copyrighted 2009.

* cited by examiner

*Primary Examiner* — Ji H Bae
(74) *Attorney, Agent, or Firm* — Milin Patel (57) ABSTRACT

Example embodiments disclosed herein relate to finding a boot loader on storage. A boot process for a computing device including storage including an extensible firmware interface aware operating system is started. The storage is searched for a boot loader associated with the extensible firmware interface aware operating system.

20 Claims, 5 Drawing Sheets

BOOTING COMPUTING DEVICES WITH EFI AWARE OPERATING SYSTEMS

BACKGROUND

Businesses are challenged to deliver quality and value to consumers, for example by providing various capabilities in manufactured computing devices while maintaining low overhead and providing quick repair service. Further, manufacturers may desire to provide consumer friendly usage of their computing devices. For example, businesses may desire to provide consumers with the ability to easily boot operating systems on devices.

BRIEF DESCRIPTION OF THE DRAWINGS

The following detailed description references the drawings, wherein.

DETAILED DESCRIPTION

As noted above, businesses such as manufacturers and consumers of manufactured computing devices may desire easy to use and understand access to booting operating systems. Some computing systems include an Extensible Firmware Interface (EFI) and may include an EFI-aware operating system or multiple EFI-aware operating systems. In certain embodiments, an EFI-aware operating system is an operating system that is loaded based on a boot variable stored on non-volatile memory, such as a non-volatile random access memory (NVRAM). The boot variable can point to a particular storage and/or a boot file on the storage to load the EFI-aware operating system. Although various examples are described using NVRAM, it is contemplated that the approaches described herein may be utilized with other memory types. Further, EFI-aware operating systems may be recognized as complying with an EFI specification, such as the Extensible Firmware Interface Specification or the Unified Extensible Firmware Interface (UEFI). Examples of EFI-aware operating systems include Windows™, Linux™, FreeBSD™, HP-UX™, and OpenVMS™. These operating systems can, for example, be desktop, laptop, or server operating systems. Moreover, EFI can be considered an interface between the EFI-aware operating system and firmware of a computing device. As detailed further below, firmware can be implemented as machine readable instructions or hardware that can be used to perform tasks.

Because EFI-aware operating systems are loaded based on a boot variable stored in non-volatile memory, when such a non-volatile memory is initialized or reset to defaults, the boot variable may be cleared or not reflect an associated bootable operating system. Tools can be utilized to generate a boot variable entry to allow booting of the operating system by booting to the tool and then using the tool to specify where on a storage device the bootable operating system is located. End-users may attempt to download these tools from outside sources, such as via a forum on the internet. However, these downloaded tools may be insecure and could possibly include viruses and other malware. Further, many end-users may not be adept at using such tools. Thus, end-users may expose their computing system(s) to malware or be frustrated by not being able to boot their computing system(s).

Additionally, because EFI-aware operating systems are loaded based on boot variables stored in the non-volatile memory, a new system board associated with a previously used device may not have the necessary boot variables stored within to automatically boot to an attached fixed storage system. In certain examples, a fixed storage system is a memory that is intended to be utilized as a permanent memory solution. A fixed storage system can include a single or multiple storage devices grouped for such a permanent memory solution. For example, fixed storage can include non-removable storage. Once again, the terms "fixed" and "non-removable" can be reflected for the intended purpose of the storage solution. Thus, both "fixed" and "non-removable" storage solutions can be removed for repair, maintenance, upgrade, etc. Examples of such fixed storage devices include hard drives, solid state drives, storage arrays or enclosures including at least one of the drives or disks, or the like. Further, in some examples, these storage devices may be determined to be fixed based on a difficulty to remove, replace, or repair the storage devices. Further, the terms "fixed" and "non-removable" can be utilized to differentiate between such devices and "removable" storage media such as tapes, floppy diskettes, compact disks, removable Universal Serial Bus (USB) drives, etc. In certain embodiments, EFI-aware operating systems on fixed storage are loaded via a boot variable in the NVRAM while operating systems on removable storage need not be loaded based on the boot variable.

In one example, a user receives a replacement system board from a manufacturer and may not be able to automatically boot from the user's previously utilized storage device. The user may request the replacement system board due to a failure in a previous system board or to upgrade a previous system board. The replacement system board could be used in conjunction with other previously utilized components of the previous system, for example, the previously utilized storage device. The storage device may include an EFI-aware operating system, which would utilize a boot variable in NVRAM associated with the system board to boot the operating system. However, as the system board is new to the storage device, the NVRAM does not have the requisite boot variables to boot the operating system.

In another example, the manufacturer of computing systems or devices may desire to quickly assemble, manufacture, or bring up computing systems. These processes can involve putting together various types of system boards with various storage devices that have been imaged with at least one EFI-aware operating system. However, to allow such system boards to be brought up in such combinations, NVRAM associated with the system boards need to be populated with boot variables that can load a particular EFI-aware operating system. This can be a time consuming manual process utilizing tools to allow an administrator to determine, select, and store the EFI-aware operating system boot variables.

To address these challenges, various embodiments herein relate to booting computing devices. A boot process of a computing device that is communicatively attached to storage (e.g., a fixed storage device) including at least one EFI-aware operating system can be initiated by elements of a system board (e.g., as part of firmware such as a basic input/output system (BIOS) startup). The boot process may initiate components by utilizing device drivers as part of the boot process. The computing device can search the storage device(s) for a boot loader or multiple boot loaders to load the EFI-aware operating system(s) as further detailed in the processes of FIGS. 3-5. In certain embodiments, a boot loader is information, such as machine readable instructions, that can be utilized to load a main operating system (e.g., an EFI-aware operating system). Such a boot loader may be stored as a file on the fixed hardware to be searched.

When a boot loader (e.g., a boot file) is found, corresponding boot variables can be created and stored in NVRAM. Moreover, representations of the boot loaders can be presented to a user. The user can select one of the representations, allowing for booting of a corresponding EFI-aware operating system associated with the selected boot loader. In certain embodiments, a representation of an operating system is a symbol or identifier of the operating system. For example, a representation can be a text string and/or graphics (e.g., an icon) indicating the represented EFI-aware operating system.

Figure 1:
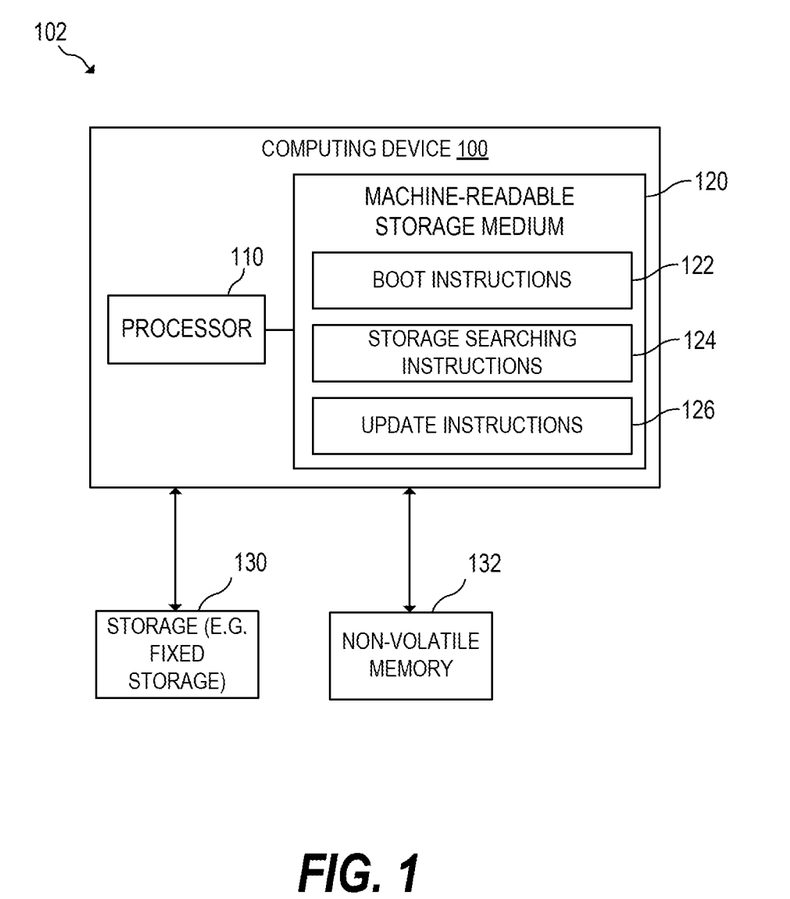
FIG. 1 is a block diagram of a computing device including instructions for booting extensible firmware interface aware operating systems, according to one example.

Referring now to the drawings, FIG. 1 is a block diagram of a computing device including instructions for booting extensible firmware interface aware operating systems, according to one example. The computing device 100 includes, for example, a processor 110 and a machine-readable storage medium 120 including instructions 122, 124, 126 for booting the computing device 100 to an operating system (e.g., an EFI-aware operating system). Computing device 100 may be, for example, a chip set of a computing system 102, a notebook computer, a desktop computer, a server, a slate or tablet computing device, a portable reading device, or any other processing device.

Processor 110 may be at least one central processing unit (CPU), at least one semiconductor-based microprocessor, at least one graphics processing unit (GPU), other hardware devices or processing elements suitable for retrieval and execution of instructions stored in machine-readable storage medium 120, or combinations thereof. For example, the processor 110 may include single or multiple cores on a chip, include multiple cores across multiple chips, multiple cores across multiple devices (e.g., if the computing device 100 includes multiple node devices), or combinations thereof. Processor 110 may fetch, decode, and execute instructions 122, 124, 126 to implement booting of the computing device 100 to an operating system. As an alternative or in addition to retrieving and executing instructions, processor 110 may include at least one integrated circuit (IC), other control logic, other electronic circuits, or combinations thereof that include a number of electronic components for performing the functionality of instructions 122, 124, 126.

Machine-readable storage medium 120 may be any electronic, magnetic, optical, or other physical storage device that contains or stores executable instructions. Thus, machine-readable storage medium 120 may be, for example, NVRAM, Random Access Memory (RAM), an Electrically Erasable Programmable Read-Only Memory (EEPROM), a storage drive, a Compact Disc Read Only Memory (CD-ROM), and the like. Further, the machine-readable storage medium 120 can be computer-readable as well as non-transitory. As described in detail below, machine-readable storage medium 120 may be encoded with a series of executable instructions for booting the computing device 100 to an operating system stored on storage 130. In some examples, the storage 130 can include one storage device (e.g., a hard drive) or multiple logical and/or physical storage devices. Further, in certain scenarios, the machine-readable storage medium 120 may be utilized, for example, as storage (e.g., a Read Only Memory (ROM), NVRAM, etc.) for BIOS or other firmware.

Figure 3:
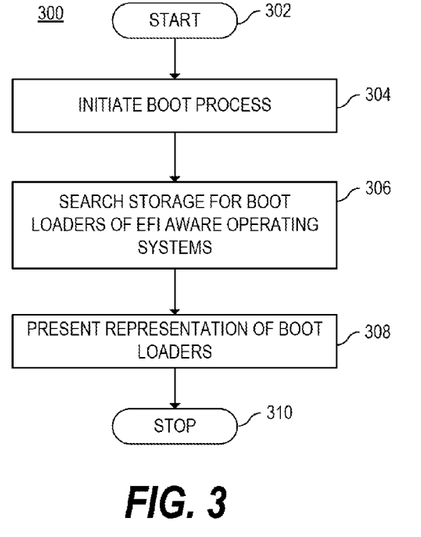
FIG. 3 is a flowchart of a method for presentation of representations of extensible firmware interface aware operating systems found during a search of a storage device, according to one example.
Figure 4:
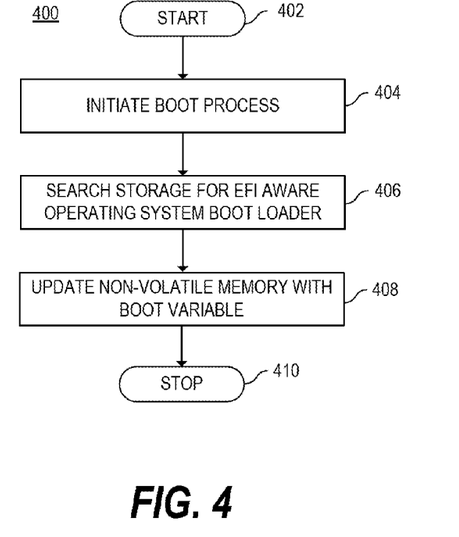
FIG. 4 is a flowchart of a method for updating a non-volatile memory with a boot variable determined based on a search of a storage device, according to one example.
Figure 5:
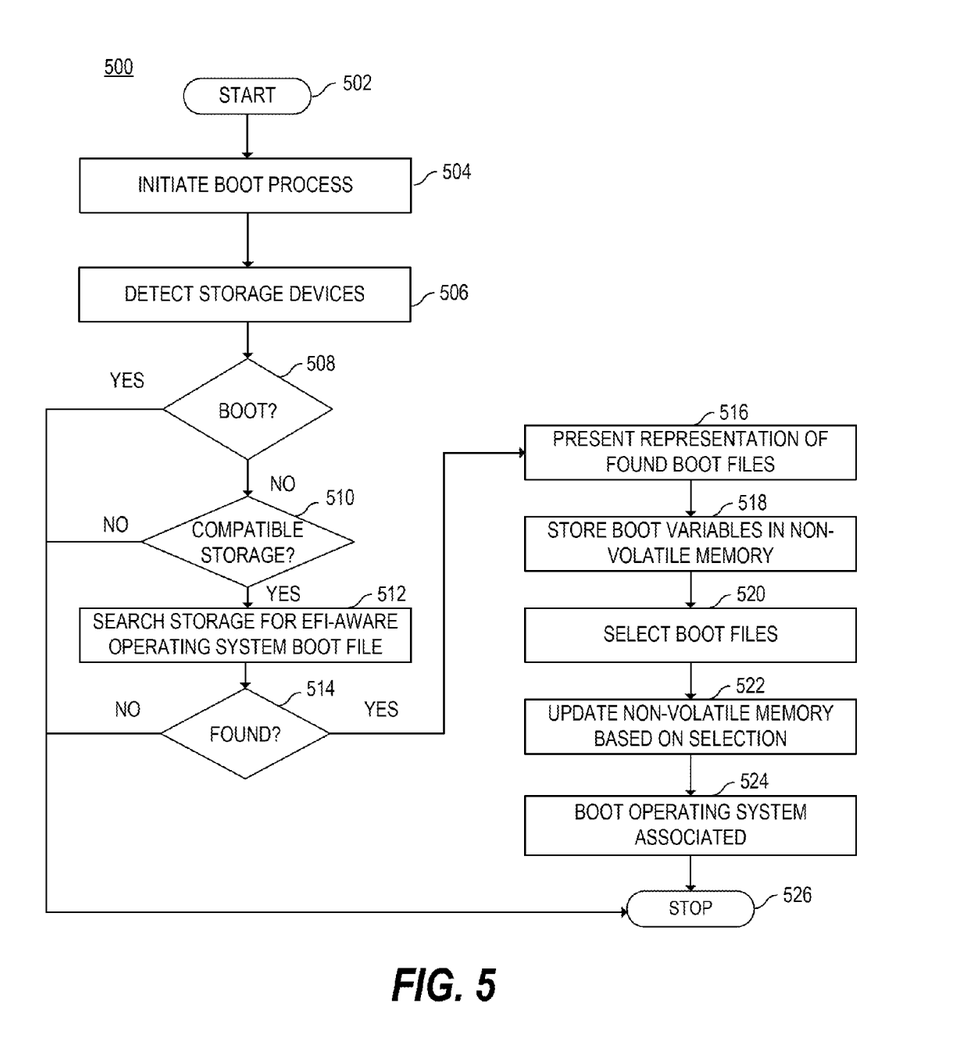
FIG. 5 is a flowchart of a method for a boot process, according to one example.

Moreover, the instructions 122, 124, 126, when executed by a processor (e.g., via one processing element or multiple processing elements of the processor) can cause the processor to perform processes, for example, the processes of FIG. 3-FIG. 5. In one example, when the computing device 100 powers on, it can execute boot instructions 122. The boot instructions 122 can be executed by the processor 110 to begin a boot process to initiate use of the computing device 100. For example, the boot process initiates components of the computing system 102.

The boot instructions 122 can look to a non-volatile memory 132 for parameters and/or settings that can be utilized for the boot process. The non-volatile memory 132 can be part of the same memory as the machine-readable storage medium 120 or be external (e.g., as part of a different memory of a system board including the machine-readable storage medium). The non-volatile memory 132 can thus include component initiation information such as driver information. Further, the non-volatile memory 132 can additionally include an order to initiate components. For example, the boot process initializes an input/output interface (e.g., a video output and keyboard input) between the computing device 100 and a user of the computing system 102.

Once components of the computing system 102 are initialized, the boot instructions 122 can cause the processor 110 to determine an operating system to boot from. The non-volatile memory 132 can include boot variables that can be used to determine the operating system(s) to boot. Boot variables, under certain scenarios, can include a pointer to a hardware device (e.g., storage 130) and/or a file on the hardware device that can be utilized to boot the operating system(s). Boot variables may additionally include an operating system partition, directory, or other operating system specific information, for example, to boot with particular operating system options (e.g., forcing a memory addressing scheme, booting into a failsafe mode, etc.).

As previously noted, in certain scenarios, the boot variables are unassociated with the storage 130. This may occur, for example, because a new system board is being utilized with the storage 130, a previously used system board is newly associated with the storage 130, the system board has not yet been utilized with an imaged operating system on the storage 130, or the like. According to certain scenarios, a system board is a printed circuit board that includes many components of the computing system 102, such as the processor 110 as well as connections to the processor 110. The processor 110 can determine that no boot variables are associated with the storage 130 by attempting to and failing to boot utilizing at least one boot variable. Further, the processor 110 can determine that there are no boot variables or that the boot variables are set to null or a default value. The processor 110 then makes a determination that storage searching instructions 124 should be executed. The determination can be based on one or more conditions (e.g., the failure to boot, null variables, etc.).

The processor 110 then executes the storage searching instructions 124 to search the storage 130 for an EFI-aware operating system. The storage searching instructions 124 can cause the processor to detect the storage 130 and/or partitions, files, directories, or the like on the storage 130. In one example, the storage 130 includes a globally unique identifier (GUID) partition table (GPT), a master boot record (MBR)

based partition table, or a combination thereof. The storage searching instructions 124 can include a checkpoint to determine whether one of these formats or another particular format (e.g., a custom format) is present. If such a format is not present on at least one storage device, the processor 110 can abort the storage search. Further, if a particular storage device does not support the requisite format, the storage device can be skipped during the search. This checkpoint may be utilized as a time saving tool to ensure that at least one storage device includes the possibility to load a compatible operating system before initiating a search for the EFI-aware operating system (s).

Moreover, the storage searching instructions 124 can search the storage for at least one boot loader. The search can be targeted to particular partitions and/or directories of a storage device or more than one of the storage devices of the storage 130. In one example, the search can be conducted on the storage device's EFI System Partition (if present) in, for example, an EFI\BOOT\ folder. Such a search can be targeted to customized locations. Once again, this mechanism can be utilized to reduce the amount of time used for the search. In other examples, the search can be conducted on one or more other locations (e.g., by parsing directory paths).

The storage searching instructions can utilize criteria to determine the locations to search as well as what files to search for. In one example, the search can be for EFI compatible boot files (e.g., *.EFI files). In other examples, the boot files searched for can include customized names and/or partial names. Thus, a manufacturer or other entity associated with developing the storage searching instructions 124 can specify partitions, directories, and/or files based on criteria to search for. Additionally or alternatively, the criteria can be stored in the non-volatile memory 132.

The search can end based on a set of rules. One rule can include that the search ends after a threshold amount of boot files (e.g., one boot file) is found. Another rule can include completing the search once each search location (e.g., partitions and/or directories) is searched. Yet another rule can include completing the search after a storage device including at least one boot file has been searched.

Approaches can be utilized to boot an operating system from the boot file results. In one example, the non-volatile memory 132 is updated with boot variables associated with the resultant boot files. The update can occur according to update instructions 126 executed by the processor 110. The computing device 100 can then be rebooted to boot the operating system utilizing the boot variables in the non-volatile memory 132.

In another example, executed boot instructions 122 can cause representations of corresponding boot files to be presented for selection. The presentation can be via, for example, a video interface. Further, selection can be made via an input device, such as a keyboard, a keypad, or the like. Additionally or alternatively, no input need be selected, but a found default boot file can be selected (e.g., the first boot file result) or the found default boot file can be selected after a timeout. Once a boot file is selected, the corresponding operating system can be booted.

In certain examples, the selected boot file can be utilized to update the non-volatile memory 132. As such, the boot order of presented boot options for future use of the computing device 100 can be based on the selection as further detailed in the descriptions of FIGS. 6A and 6B.

Figure 2:
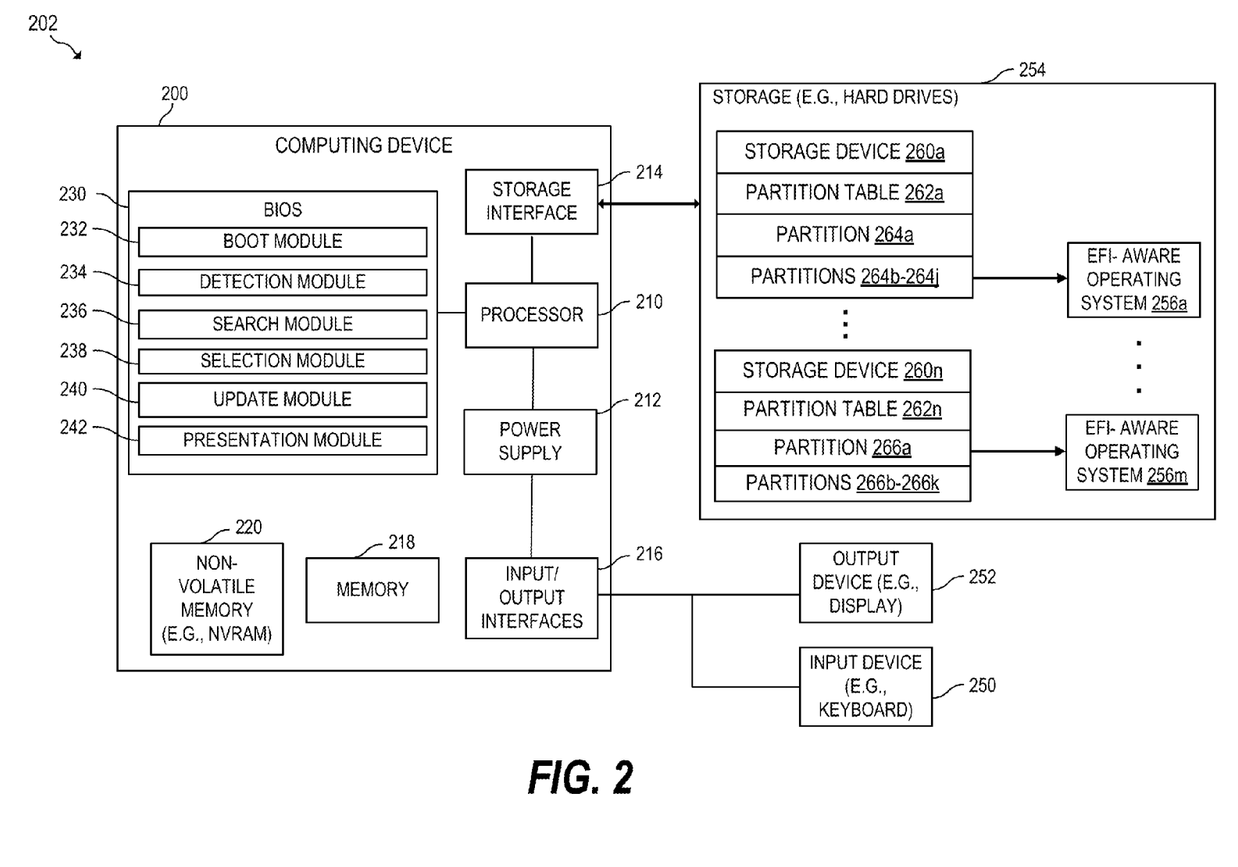
FIG. 2 is a block diagram of a computing system including modules to boot extensible firmware interface aware operating systems, according to one example.

FIG. 2 is a block diagram of a computing system including modules to boot extensible firmware interface aware operating systems, according to one example. In this example, a computing device 200 of the computing system 202 includes a processor 210, a power supply 212, a storage interface 214, input/output interfaces 216, memory 218 (e.g., primary memory), non-volatile memory (e.g., NVRAM) 220, and a BIOS 230 including a boot module 232, a detection module 234, a search module 236, a selection module 238, an update module 240, and a presentation module 242. As detailed below, computing device 200 may be utilized to boot an EFI-aware operating system. Further, the computing device 200 can automatically configure EFI boot paths. EFI boot paths can be stored in the non-volatile memory 220, for example, as boot variables.

As with computing device 100 of FIG. 1, computing device 200 may be a notebook computer, a slate computing device, a portable reading device, a wireless email device, a mobile phone, a system board including the components, or any other computing device used in booting of EFI-aware operating systems. As with processor 110, processor 210 may be a CPU, GPU, or microprocessor suitable for retrieval and execution of instructions and/or electronic circuits configured to perform the functionality of any of the modules 232-242 described below. Further, processor 210 can include multiple processing elements, such as CPUs, GPUs, control logic, or the like.

As detailed below, computing device 200 may include a series of modules 232-242 for booting an EFI-aware operating system. These modules 232-242 can be included as part of a BIOS or other firmware associated with the computing device 200. Each of the modules 232-242 may include, for example, hardware devices including electronic circuitry for implementing the functionality described below. In addition or as an alternative, each module may be implemented as a series of instructions encoded on a machine-readable storage medium of computing device 200 and executable by processor 210. It should be noted that, in some embodiments, some modules are implemented as hardware devices, while other modules are implemented as executable instructions.

The power supply 212 is used to provide power to the computing device 200. The power supply 212 can include a plug-in supply, a battery supply, or a combination thereof. When power is provided for the computing device 200, for example, when a power button is triggered, the processor 210 can initiate execution of instructions associated with a firmware of the computing device 200 (e.g., the BIOS 230). In one example, instructions executed can include a power on self test, detection of devices or components, loading drivers to utilize devices and components, combinations thereof, etc.

As previously noted, the BIOS 230 can be implemented as a firmware of the computing device 200. In certain scenarios, the BIOS 230 is the first code that is executed by the processor 210 when the computing device 200 is powered on. The modules 232-242 of the BIOS 230 then initialize and identify devices associated with the computing system 202. Moreover, the BIOS 230 is responsible for turning over control of the computing device 200 to an operating system (e.g., via a boot loader).

Instructions associated with the boot module 232 begin execution at the processor 210 when power is applied. The boot module 232 initializes components of the computing device 200. By way of example, the boot process initializes interfaces of the computing device 200, such as input/output interfaces 216, storage interfaces 214, or the like. For example, an input interface of the computing device 200 can be connected to an input device 250 such as a keyboard, a mouse, a remote, a keypad, or the like. Further, an output interface may be connected to an output device 252 such as a display, a projector, a printer, a messaging device, or the like. Additionally or alternatively, the computing device 200 may include devices utilized for input and output (not shown), such as a touch screen interface, a networking interface (e.g., Ethernet), a wireless networking interface, etc. Moreover, the storage interface 214 may be connected to storage 254. As previously noted, the storage 254 can be fixed or non-removable. In certain embodiments, a fixed or non-removable storage device (e.g., an internal hard drive, an internal solid state drive, an internal or external enclosure, or the like) can include an EFI-aware operating system 256 (e.g., EFI-aware operating systems 256a-256m). In one example, an enclosure can be connected to the computing device 200 via a fiber channel or other storage interface. In another example, the storage 254 is connected to the computing device 200 via internal means such as a Serial Advanced Technology Attachment (SATA), Parallel Advanced Technology Attachment (PATA), other busses, or the like. The order of components and/or devices to be initialized may be based on non-volatile memory 220 storing boot order information.

During the boot process initiated by the boot module 232, the detection module 234 searches for devices connected to the initialized interfaces. More particularly, the detection module 234 can detect input devices 250, output devices 252, storage 254, or the like. Certain devices can be detected to generic levels (e.g., a keyboard is attached, an output is detected, etc.), while other devices can be detected at more specific levels (e.g., a network device type, a storage type, a storage model, a storage size, etc.). Further, during the boot process, the detection module 234 can detect storage devices 260a-260n, associated partition tables 262a-262n respectively associated with storage devices 260a-260n, partitions 264a-264j and 266a-266k, respectively associated with storage devices 260a-260n, or combinations thereof. As such, the storage 254 can include one storage device 260a or multiple storage devices 260a-260n.

As the boot process proceeds, the boot module 232 reads a boot order list of operating systems from the non-volatile memory 220. The boot order list of operating systems can include boot variables utilized in booting an operating system (e.g., an EFI-aware operating system). A boot variable can point to a device, partition, path, boot file, or a combination thereof on the storage 254. If such a boot variable is found and can be executed, the boot module 232 can load the corresponding operating system. At this time, the boot module 232 can turn over execution of the computing device 200 to the operating system. However, as noted above, there are times when the boot module 232 is unable to find a boot variable in the non-volatile memory 220 or the boot loader indicated by the boot variable cannot be loaded or cannot be executed properly.

The boot process utilizes the search module 236 to search storage 254 for boot entries corresponding to at least one EFI-aware operating system 256. As previously noted, the storage 254 may include one fixed storage device or multiple storage devices including at least one EFI-aware operating system 256. In one example, the search module 236 searches at least one storage device 260a to determine whether the storage device 260a is compatible with an EFI-aware operating system. If the storage device 260a is compatible (e.g., formatted in a known manner that may include the EFI-aware operating system), the search module 236 continues the search. The search module 236 can determine whether the storage device 260a is compatible based on a determination of a type of partition table 262a (e.g., a GPT partition table, another known partition table, another known incompatible partition table, etc.). Further, the search module 236 can check partitions 264a-264j of the storage device 260a to determine if the search module 236 can understand a formatting (e.g., a type of File Allocation Table (FAT) format) of the respective partitions 264a-264j. In certain scenarios, certain partitions of the storage device 260a may be readable while others are unreadable.

Further, the search can be targeted via rules. For example, a search rule can include searching a particular path for boot files. Such a search rule allows for quick searching for boot files if the boot files on the storage 254 are stored in accordance with the rule(s). In one example, a \EFI\BOOT path on a partition can be searched for boot files (e.g., *.EFI files). Other paths and/or other file types can be searched for as well. Additionally, file structure paths can be traversed during the search for boot files. As such, the search module 236 can traverse trees of the file system of one storage device or multiple storage devices to find a boot file or multiple boot files. Moreover, the search can be ended according to a rule or multiple rules as discussed above. The end result of the search can be no found boot files, one found boot file, or multiple found boot files. As such, multiple storage devices 260a-260n and/or multiple partitions 264a-264j, 266a-266k may be searched for the boot files.

The presentation module 242 may present representations of boot files found by the search module 236. If there are multiple boot files that are found, representations corresponding to the boot files are presented and can be selected via the selection module 238. A user can select a representation to utilize based using the input device 250. When the selection module 238 receives a selection, the selection module 238 can cause booting of an operating system associated with the corresponding boot file. In certain scenarios the boot is direct after selection. In other scenarios, the selection is utilized to update the non-volatile memory 220 with a boot variable. Thus, during the next reboot, the boot variable associated with the selected boot file may be booted. In one scenario, the boot variable is utilized for booting based on a presentation and selection of boot variables. In another scenario, the boot variable is booted directly (e.g., by default).

The update module 240 is utilized to update the non-volatile memory 220. For example, the update module 240 can utilize a set variable function or instructions to set a boot variable to correspond to boot files found during the search, a selected boot file, or a combination thereof. Thus, in one scenario, one boot variable is updated (e.g., replaced or created). This can be, for example, because the corresponding boot file was selected, because a single boot file was found during the search, or the like. In another scenario, multiple boot variables (e.g., boot variables corresponding to multiple found boot files) are updated using the update module 240. Further, a boot selection list of boot variables can be ordered by the update module 240 so that the selected boot file is presented at the top of a presented list and/or as a default selection. Moreover, the update module 240 can be utilized to remove or demote boot entries. For example, if a boot attempt fails or is unsuccessful, the update module 240 can cause an update to remove or demote the failed boot entry. When demoted, a valid boot entry can be promoted. In certain embodiments, a boot entry is a storage data structure that is stored in the non-volatile memory 220 and associated with a particular bootable EFI-aware operating system.

FIG. 3 is a flowchart of a method for presentation of representations of extensible firmware interface aware operating systems found during a search of a storage device, according to one embodiment. Although execution of method 300 is described below with reference to computing device 100, other suitable components for execution of method 300 can be utilized (e.g., computing device 200). Additionally, the components for executing the method 300 may be spread among multiple devices. Method 300 may be implemented in the form of executable instructions stored on a machine-readable storage medium, such as storage medium 120, and/or in the form of electronic circuitry. Moreover, a processor 110, a machine-readable storage medium 120, other control logic, or a combination thereof can be considered means for presenting representations of EFI-aware operating systems found during a search of a storage device.

Method 300 may start at 302 and proceed to 304, where computing device 100 may initiate a boot process. The boot process may begin when the computing device 100 is powered on, reset, or the boot process is otherwise triggered (e.g., as part of a BIOS procedure). As previously noted, the computing device 100 may be associated with fixed storage that includes multiple EFI-aware operating systems. The operating systems can exist on one partition of a storage device, multiple partitions on a storage device, or multiple partitions on multiple storage devices. Storage devices can further be logical or physical, for example, a single physical storage device may include a single or multiple logical storage devices that may include the partitions. The boot process initializes the components of the computing device 100 as detailed above. Further, the boot process is responsible for causing booting of one of the EFI-aware operating systems. As such, the boot process loads information from the non-volatile memory 132 to attempt to boot to an EFI-aware operating system.

If the attempted boot fails or another trigger (e.g., a setting in the non-volatile memory 132, an input trigger, or the like) occurs, the boot process searches the storage 130 for the EFI-aware operating systems. At 306, the computing device 100 searches the fixed storage for a plurality of boot loaders respectively associated with the EFI-aware operating systems. The search can include searching a partition or multiple partitions of the fixed storage for the boot loaders. Moreover, as previously noted, the fixed storage can be searched based on a rule or multiple rules. In one example, the search is targeted to a path available on a partition. In another example, the search is conducted so that directories of the fixed storage are traversed during the search. Further, as previously noted, various rules can be utilized to determine when to end the search. For example, the search can end based on a timer. When the timer reaches a threshold, the search may be completed. In another example, the termination of the search can be based on a number of results. With this example approach the search can be terminated when the number of results reaches or exceeds a particular threshold. Moreover, a combination of a timer and threshold results can be utilized to terminate the search. The combination can involve, for example, a countdown timer to be begin when a certain threshold of results if found. When the countdown ends, the search may end.

At 308 the device presents representations of the boot loaders found during the search. The representations may be presented during the search or after the search is complete. With this approach, multiple representations of boot loaders can be presented via the computing device 100 to a user. Further, the presentation can occur via an output to a visual device such as a display or a projector. Finally, method 300 may proceed to 310, where method 300 may stop.

As previously noted, the computing device 100 can receive a selection input associated with one of the boot loaders in response to the presentation. The selection input can thus initiate booting of the operating system corresponding to the selected boot loader. Further, the selected boot loader can be utilized for update of the non-volatile memory 132 as previously described.

FIG. 4 is a flowchart of a method for updating a non-volatile memory with a boot variable determined based on a search of a storage device, according to one embodiment. Although execution of method 400 is described below with reference to computing device 100, other suitable components for execution of method 400 can be utilized (e.g., computing device 200). Additionally, the components for executing the method 400 may be spread among multiple devices. Method 400 may be implemented in the form of executable instructions stored on a machine-readable storage medium, such as storage medium 120, and/or in the form of electronic circuitry. Moreover, a processor 110, a machine-readable storage medium 120, other control logic, or a combination thereof can be considered means for updating a non-volatile memory with a boot variable determined based on a search of storage.

Method 400 may start at 402 and proceed to 404, where computing device 100 may initiate a boot process for a computing system 102. The boot process may be part of a BIOS system or computing device firmware and, as noted above, can be initiated as part of a startup procedure of the computing system 102. The computing system 102 includes, for example, storage 130 (e.g., a non-removable storage, such as a hard drive) including an EFI-aware operating system. The boot process can initialize components and/or devices associated with the computing device 100.

Then, the boot process can turn to booting an operating system. The processor 110 checks a non-volatile memory 132 to determine a boot variable that can be utilized in loading an EFI-aware operating system. The non-volatile memory 132 can be, for example, NVRAM associated with a BIOS or other firmware of the computing system 102. In certain embodiments, the BIOS or other firmware and/or the non-volatile memory 132 can be located on a system board of the computing system 102. Further, in certain examples, the storage 130 can be located external to the system board and connected via an interface.

A rule can be utilized to determine whether to search the storage for the EFI-aware operating system. For example, a search can be triggered if the processor 110 determines that there is no boot variable stored in the non-volatile memory 132, if an attempted boot using one of or each of the boot variables stored in the non-volatile memory 132 fails, if a specified condition or event occurs, or the like.

At 406, processor 110 is caused to search the storage 130 to determine a boot loader associated with the EFI-aware operating system. As previously noted, the search can be targeted to particular locations or can traverse directories or other file structures. Moreover, the search can be conducted for boot loaders with particular filenames (e.g., BOOTIA64, BOOTX64, BOOTIA32), particular extensions (e.g., *.EFI), or the like. These filenames and/or targeted boot path locations can be customized. For example, a manufacturer may customize operating system images and/or the firmware. This can enable the manufacturer to quickly set up customized images on products. Moreover, this allows for the manufacturer to set up security mechanisms, for example, by not retrieving results for unknown boot files.

The processor 110 then receives the results of the search. In one example, the boot loader associated with the EFI-aware operating system is found in this manner. At 408, the processor 110 updates the non-volatile memory 132 of the computing system 102 with information associated with the boot loader. Such information can include a boot variable. The information can include a name for a representation of the boot loader, a location of the boot loader file (e.g., a storage device, a partition, a path, a boot loader file name, a combination thereof, etc.), or the like. By way of example, the update can include updating boot variables in the non-volatile memory 132 as well as creating and storing new boot variables. The update can occur by determining and formatting the information to store and writing the information to the non-volatile memory 132. Finally, method 400 may proceed to 410, where method 400 may stop.

FIG. 5 is a flowchart of a method for a boot process, according to one embodiment. Although execution of method 500 is described below with reference to computing device 200, other suitable components for execution of method 500 can be utilized (e.g., computing device 100). Additionally, the components for executing the method 500 may be spread among multiple devices (e.g., the computing device 200, a storage enclosure, etc.). Method 500 may be implemented in the form of executable instructions stored on a machine-readable storage medium, such as firmware, BIOS 230, in the form of electronic circuitry, combinations thereof, etc.

Method 500 may start in 502 and proceed to 504, where computing device 200 may initiate a boot process for a computing system 202. As noted above, the boot module 232 can initiate an initialization process. Further, the boot module 232 can be utilized to boot an operating system. The initialization process can include a power on self test as well as loading drivers of components of the computing system 202.

During the initialization process, at 506, the detection module 234 detects storage 254. The storage 254 can include one storage device or multiple storage devices including EFI-aware operating system(s). As such, the computing system 202 may include fixed or non-removable storage including an EFI-aware operating system or multiple EFI-aware operating systems. Thus, the detection module 234 can detect a storage device 260a and another storage device 260n. Further, in certain examples, partition information of the storage 254 is determined.

Then, at 508, the computing device 200 attempts to boot an operating system via NVRAM. In one scenario, if the boot module 232 is able to boot an operating system, the boot process stops at 526 and a boot variable of the NVRAM is utilized to load the operating system and the processes of the computing device 200 are turned over to the operating system. In another scenario, the boot module 232 can determine that the boot was unsuccessful. This determination can be made if the NVRAM is checked and has a NULL value, another associated flag indicating that no boot information is present, or the like. Further, this determination can be made if the NVRAM has a boot variable with particular values, but the boot variable is incompatible with current computing system parameters. This can occur, for example, if the boot variable indicates that a particular type of storage 254 is where the operating system is stored, but the storage 254 does not include that type of storage. Moreover, an event or condition can occur (e.g., an input) that indicates that an operating system should not be booted, but instead a search for other operating systems should occur.

At 510, the computing device 200 determines whether the storage 254 is compatible with the firmware. This can be a determination of whether the storage 254 can include an EFI-aware operating system. The computing device 200 can detect a GPT, a MBR, a GPT in a protective master boot record partition table, or a combination thereof as part of the storage 254. If, for example, a GPT is not found, the storage 254 may be deemed incompatible and the process can stop at 526. Further, a partition table may indicate that an EFI-aware operating system is present on the respective storage device 260. With this approach, boot time can be reduced because incompatible storage devices 260 need not be searched.

As described above, the search module 236 searches the storage 254 for an EFI-aware operating system boot file (512). As previously noted, the search can include the searching a directory of the storage 254 for the boot files. Further, the search can be narrowed based on the detection of compatible storage and/or a search of a partition table associated with the storage 254. As previously noted, the storage 254 can include storage devices 260, each of which can be searched for EFI-aware operating systems. Moreover, the detection of a GPT, a MBR, a GPT in a protective master boot record partition table, or a combination thereof can be utilized in determining the directory. In one example, a partition table may point to the directory and/or mark a partition with an EFI system boot loader file. In another example, the GPT partition in the protective MBR's partition table, on the first sector of the storage device 260, can be marked as a 0xEE type. This detection can indicate the possibility of the existence of the EFI-aware operating system based on an assumption that the EFI-aware operating system will format the storage device 260 with such a type.

The processor 210 determines whether the EFI-aware search yielded results (514). In one embodiment, if no boot files are found during the search, the boot process can be stopped at 526. In other embodiment, if a boot file or multiple boot files respectively associated with EFI-aware operating systems are found, the method 500 continues at 516.

At 516, the presentation module 242 causes presentation of a representation of any boot files (e.g., boot loader files) found during the search. This presentation can be caused via, for example, a video interface to a display device. The representation can be, for example, a text string and/or graphics indicating the represented EFI-aware operating system. Further, the representation can include multiple found boot loader files. In certain examples, the representations can be added to a presentation while searches for additional boot loader files commence. In other examples, the search module 236 can complete search for a boot loader and other boot loaders before presentation.

In certain embodiments, at 518, the processor 210 determines to store a boot variable corresponding to the boot files found in NVRAM. The boot variable can be, for example, a boot order variable that includes EFI boot options. These boot options can include storage device information, a path name for the respective EFI boot files, respective partition information associated with the EFI boot files, a parameter or set of parameters to pass to the program loaded when the respective EFI boot file is executed, combinations thereof, or the like.

Further, a selection of one of the presented representations can be received by the selection module 238 at 520. Selection information can be received via an input device 250. The selection can thus indicate the corresponding boot loader or boot entry.

In one embodiment, at 522, the NVRAM is updated based on the selection. For example, a boot order of EFI-aware operating systems can be updated based on the selection. In this manner, the NVRAM can include the selected boot loader representation as a first boot entry. Further, the selected boot loader can be considered a default boot loader to load if there are multiple boot loaders stored in the NVRAM. In certain examples, the storing at 518 can occur during this updating process.

Moreover, according to certain embodiments, at 524 the boot module 524 boots an EFI-aware operating system found during the search. In one example, the booting occurs in response to the selection at 520. In another example, the booting occurs after the storage boot variables in NVRAM and a reboot. With this approach, once the NVRAM is updated, the next boot and further boots of the computing system 202 is able to utilize the NVRAM to boot to the EFI-aware operating system (e.g., based on a boot entry corresponding to a boot loader). Finally, method 500 may proceed to 526, where method 500 may stop.

Figure 6A:
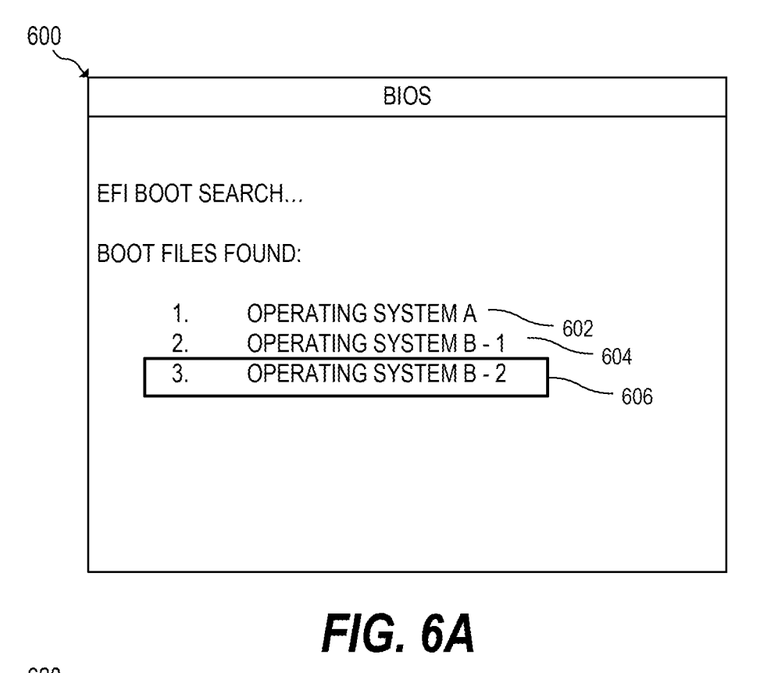
FIGS. 6A and 6B are user interfaces for searching for and selecting operating systems, according to various examples.
Figure 6B:
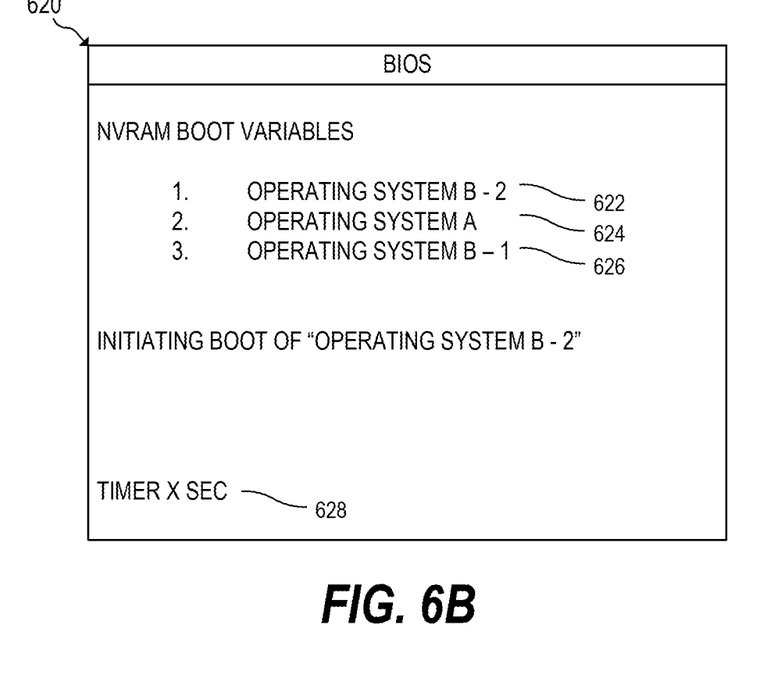

FIGS. 6A and 6B are user interfaces for searching for and selecting operating systems, according to various examples. Example user interface 600 of FIG. 6A can be presented during a boot process (e.g., via execution of BIOS instructions). This presentation can occur via an output to a visual device, such as a display. Further, the presentation of the user interface 600 can be part of the search of methods 300, 400, 500. Additionally or alternatively, the user interface 600 may be presented after the search is completed.

In this example, user interface 600 may be presented to allow a user to select an operating system boot file representation 602, 604, 606. Various types of boot files can be presented. For example, representation 602 is associated with operating system A (e.g., a Windows® based operating system). Further, representation 604 is may be associated with operating system B (e.g., a Linux® based operating system). This representation 604 can be associated with a set of parameters (e.g., a memory interface parameter, driver setting parameters, or the like). As shown, representation 606 includes operating system B with another set of parameters. These parameters can be stored as part of the associated boot file.

As previously described, representation 606 can be selected. The selection can be utilized as a basis for an action by the boot process. For example, the boot process can load the boot loader associated with representation 606. Further, as shown in user interface 620 of FIG. 6B, the boot process can update boot variables corresponding to the represented operating systems to NVRAM based on the selection. As such, during boot of the computing device 100, representations 622, 624, 626 are presented based on reading the NVRAM. As shown, operating system B with the other set of parameters can be the first shown representation 622. Setting the operating system B representation 622 to the first position can be accomplished utilizing the selection as a mechanism for deciding the order. Additionally, the user can be prompted to choose an operating system representation 622, 624, 626 to load. Further, the representation 622 may be set as a default operating system to load (e.g., if a threshold for a preset timer 628 is met before selection).

What is claimed is:

1. A non-transitory computer-readable storage medium storing instructions that, when executed by a processor, cause the processor to:
   start a boot process for a computing device including a fixed storage including a plurality of extensible firmware interface (EFI) aware operating systems;
   search, during the boot process, a directory of the fixed storage for a plurality of EFI boot loader files respectively associated with the extensible firmware interface aware operating systems until a threshold number of the EFI boot loader files is found or until a timer reaches a threshold; and
   present representations of the respective EFI boot loader files.

2. The non-transitory computer-readable storage medium of claim 1, further comprising instructions that, when executed by the processor, cause the processor to:
   receive a selection input indicating one of the EFI boot loader files; and
   initiate booting of the operating system corresponding to the one EFI boot loader file.

3. The non-transitory computer-readable storage medium of claim 1, wherein the instructions to search the fixed storage further include instructions that cause the processor to:
   store respective boot variables for the respective EFI boot loader files in a non-volatile memory.

4. The non-transitory computer-readable storage medium of claim 3, wherein the non-volatile memory is associated with a basic input output system (BIOS).

5. The non-transitory computer-readable storage medium of claim 3, wherein the instructions to search the fixed storage further include instructions that cause the processor to:
   detect a globally unique identifier partition table in a protective master boot record partition table of the fixed storage, wherein the search of the directory is based on the detection.

6. The non-transitory computer-readable storage medium of claim 1, wherein the search of the directory includes searching for at least a partial string name by parsing the fixed storage.

7. The non-transitory computer-readable storage medium of claim 6, wherein the partial string name includes a customized name associated with a manufacturer of the computing device.

8. The non-transitory computer-readable storage medium of claim 1 wherein the search is to continue until the timer reaches the threshold.

9. The non-transitory computer-readable storage medium of claim 1 wherein the search is to continue until the threshold number of the EFI boot loader files is found.

10. The non-transitory computer-readable storage medium of claim 1 wherein the search is to continue until the timer reaches the threshold after beginning a countdown when the threshold number of the EFI boot loader files is found.

11. A method comprising:
   initiating a boot process for a computing system including a non-removable storage including an extensible firmware interface (EFI) aware operating system;
   searching, during the boot process, a directory of the non-removable storage to determine an EFI boot loader file associated with the extensible firmware interface aware operating system until a threshold number of the EFI boot loader files is found or until a timer reaches a threshold; and
   updating a non-volatile memory of the computing system with information associated with the EFI boot loader file.

12. The method of claim 11, wherein the non-removable storage is a hard drive and the non-volatile memory is associated with a basic input output system (BIOS).

13. The method of claim 12, wherein the BIOS is located on a system board of the computing system.

14. The method of claim 11, wherein the search of the directory of the non-removable storage includes determining that the non-removable storage includes a globally unique identifier partition table, a master boot record partition table, or a combination thereof that indicates a partition including the EFI boot loader file.

15. The method of claim 11, further comprising:
   identifying another EFI boot loader file during the search; and
   updating the non-volatile memory with the other EFI boot loader file.

16. The method of claim 11, further comprising:
   identifying another EFI boot loader file during the search;
   presenting a representation of the EFI boot loader file and the other EFI boot loader file;

receiving a selection input indicating the EFI boot loader file; and causing booting of the extensible firmware interface aware operating system using the EFI boot loader file.

17. The method of claim 11, further comprising:

detecting another non-removable storage including another extensible firmware interface aware operating system;

searching the other non-removable storage for another EFI boot loader file; and updating the non-volatile memory with an extensible firmware interface boot variable entry corresponding to the other EFI boot loader file.

18. A computing device comprising:

a non-transitory computer-readable storage medium storing instructions that, when executed by a processor, cause the processor to:

initialize the computing device during a boot process;

determine, during the boot process, a fixed storage, wherein the fixed storage device includes a plurality of extensible firmware interface (EFI) aware operating systems;

search, during the boot process, directories of the storage for a plurality of EFI boot loader files corresponding to the extensible firmware interface aware operating systems until a threshold number of the EFI boot loader files is found or until a timer reaches a threshold;

cause presentation of respective representations of boot entries associated with the EFI boot loader files;

select one of the EFI boot loader files; and update the non-volatile memory with extensible firmware interface boot variables corresponding to the EFI boot loader files.

19. The computing device of claim 18, further comprising:

the fixed storage device, wherein the non-transitory computer-readable storage medium further comprises instructions, that, when executed by the processor, cause the processor to:

store the selected one boot loader file as a first entry in a boot order stored in the non-volatile memory.

20. The computing device of claim 18, wherein the non-transitory computer-readable storage medium further comprises instructions, that, when executed by the processor, cause the processor to:

attempt to perform a boot to one of the EFI boot loader files;

determine that the boot was unsuccessful; and cause the update module to remove or demote in a boot order an entry associated with the one boot loader file.

* * * * *